United States Patent Office 3,489,181
Patented Jan. 13, 1970

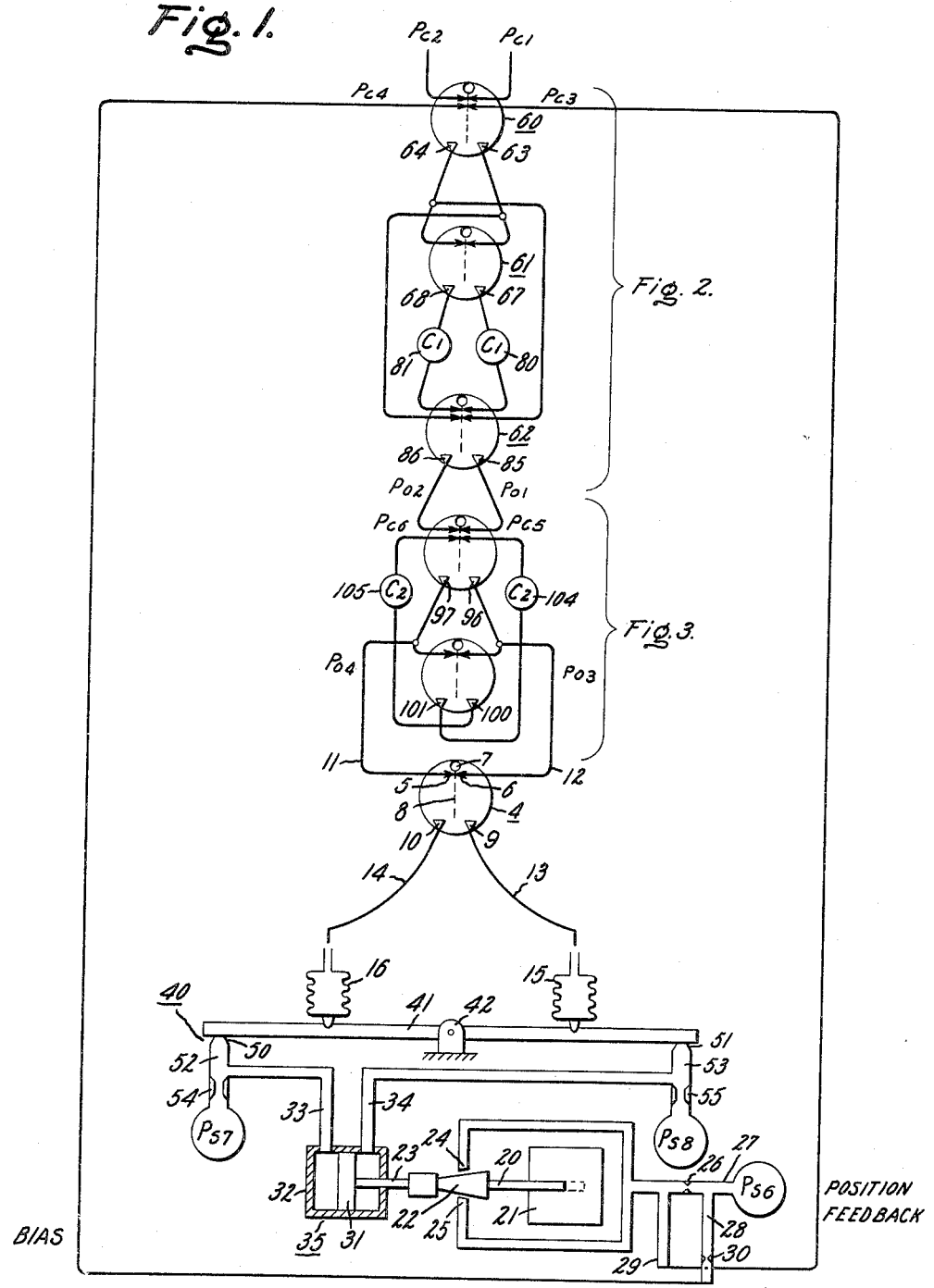

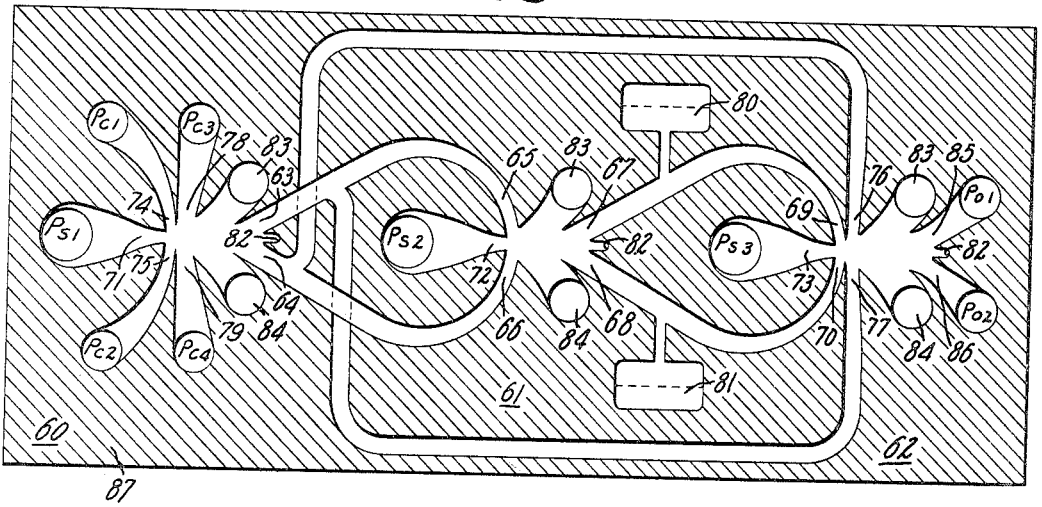
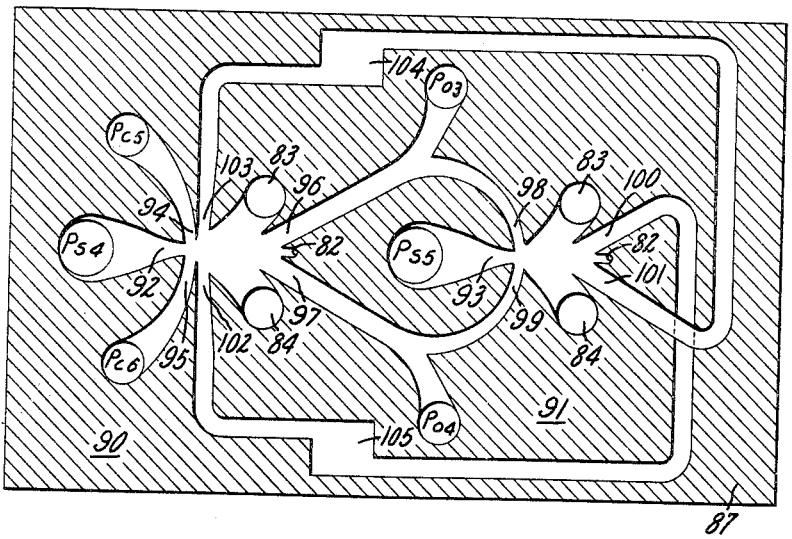
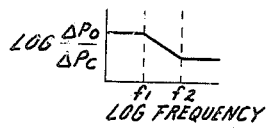
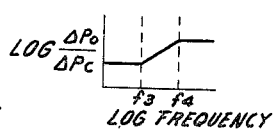

3,489,181
FLUID AMPLIFIER POSITION CONTROL SYSTEM
Willis A. Boothe, Scotia, N.Y., assignor to General Electric Company, a corporation of New York
Filed Oct. 23, 1964, Ser. No. 405,928
Int. Cl. F15c 1/08; G06d 1/02; G06m 1/12
U.S. Cl. 137—81.5                                       9 Claims

ABSTRACT OF THE DISCLOSURE

A fluidic position control system includes lag-lead and lead-lag frequency responsive fluidic circuits and a pair of bellows which control the position of a movable member. A pressurized fluid signal representing position error is supplied to the control inlets of the lag-lead circuit which is constructed from three analog-type fluid amplifiers and fluid capacitances. The lead-lag circuit is connected between the lag-lead circuit and bellows, and is constructed from two analog-type fluid amplifiers and fluid capacitances.

---

My invention relates to a position control system employing fluid amplifiers, and in particular, to the fluid amplifier circuitry and fluid-mechanical transducer actuated thereby.

The invention described herein was made in the performance of work under a NASA contract and is subject to the provisions of the National Aeronautics and Space Act of 1958, Public Law 85-568 (72 Stat. 426; 42 U.S.C. 2451), as amended.

Position control systems find application in many phases of technology wherein it is desired to maintain a movable member in a predetermined position relative to a non-movable member or a particular reference. Illustrations of position control systems are machine tool control, the control of the actuating piston of a steam valve in a steam turbine, and the rod control for a nuclear reactor.

Frequently, the region in which the control system operates introduces extreme environmental problems, such as shock, vibration, nuclear radiation and high temperature. Prior art systems, particularly those comprising electronic elements and nonfluid mechanical elements, are often incapable of withstanding such extreme environmental conditions and thus do not perform in a satisfactory manner.

In contradistinction, fluid control devices, especially the type known as fluid amplifiers, feature reliability and an essentially unlimited life span since generally they employ no mechanical moving parts. Further, they can be produced at low cost due to their ease of fabrication from virtually any material that is nonporous and has structural rigidity. In addition, the devices may be connected in circuit relationship either by appropriate interconnection of individual devices or by the formation of the devices in interconnected fashion directly in a single piece of material. Fluid control devices are thus particularly ideal for applications such as steam valve control for steam turbines wherein conditions of high temperature and vibration are present, and rod position control for nuclear reactors which introduce environmental problems of nuclear radiation and high temperature.

Therefore, one of the principal objects of my invention is to provide fluid amplifier circuitry adapted for use in a position control system.

Another object of my invention is to provide various such fluid amplifier circuits having predetermined gain versus frequency responses.

A still further object of my invention is to provide a fluid-mechanical transducer adapted to convert the output of a fluid amplifier to a mechanical force for actuating the movable member to be controlled in a position control system.

Briefly stated, my invention provides a fluid amplifier circuit having as control signal inputs a first pressurized fluid flow representing a desired position of a movable member being controlled and a second pressurized fluid flow representing the actual position thereof. The summation of the two control signals represents the error between the desired position and actual position of the movable member being controlled. The output of the fluid amplifier circuit is conveyed to a fluid-mechanical transducer which in accordance with my invention comprises a pair of bellows. The bellows form a portion of a force-balance circuit which positions the movable member being controlled. The gain and frequency response of the position control system which the fluid amplifier circuit and bellows comprise a part thereof may be improved by employing additional fluid amplifier circuitry in accordance with my invention. The additional fluid amplifier circuits are designed to provide selective frequency responsive amplification of the control signal inputs. Thus, a lead-lag type of frequency responsive fluid amplifier circuit is added to the position control system to obtain a desired control system stability. In order to obtain increased control system gain, a lag-lead type of frequency responsive fluid amplifier circuit is employed.

The features of my invention which I desire to protect herein are pointed out with particularity in the appended claims. The invention itself, however, both as to its organization and method of operation, together with further objects and advantages thereof, may best be understood by reference to the following description taken in connection with the accompanying drawings, wherein like parts in each of the several figures are identified by the same reference character, and wherein:

FIGURE 1 is a schematic diagram representation of a position control system constructed in accordance with my invention;

FIGURE 2 is a diagrammatic view in top plan of the lag-lead fluid amplifier circuit shown schematically in FIGURE 1;

FIGURE 2A is a graph showing operating characteristics of the lag-lead circuit of FIGURE 2;

FIGURE 3 is a diagrammatic view in top plan of the lead-lag fluid amplifier circuit shown schematically in FIGURE 1; and FIGURE 3A is a graph showing the operating characteristics of the lead-lag circuit of FIGURE 3.

Referring now to the drawings, in FIGURE 1 there is shown a schematic diagram of a position control system which for purposes of illustration will be described with reference to a rod control for a nuclear reactor. It is to be understood that my invention is not limited to such particular position control system, but may find application in other position controls such as machine tool control and steam turbine valve control.

The fluid control devices known as fluid amplifiers which are employed in my invention are of the analog-type, one form of which is the momentum-exchange type. The analog-type fluid amplifier may be described as comprising a fluid flow passage terminating in a fluid flow restrictor or nozzle (power fluid inlet) for forming power fluid received therein into a power jet. The fluid medium employed may be a compressible fluid such as gases including air or steam, or a relatively incompressible fluid such as water or oil. The source of power fluid is preferably maintained at a constant pressure. A pair of oppositely disposed control fluid inlets are generally employed for forming control fluid received therein (the control signal input) into control jets directed against opposite sides of the power jet. Finally, a pair of fluid receiving passages (receivers) are positioned downstream from the power nozzle such that in the case of balanced control jets issuing from the control fluid inlets, fluid of the power jet is distributed equally between the two fluid receivers. The control fluid flow, in the presence of an error in the position control system comprises a differential pressure signal which forms unequal or unbalanced control fluid jets that cause deflection of the power fluid jet by momentum exchange action such that one of the receivers obtains proportionally more of the fluid of the power jet than the other receiver. The resultant unequal flows of power fluid in the two receivers produces a fluid output differential pressure signal. The analog-type fluid amplifier derives its nomenclature from the proportional increases and decreases effected in the flows of output power fluid in the receiver passages, one relative to the other, in response to increases and decreases in the relative magnitudes of the control jets. The analog-type fluid amplifier thus provides gain, the change in pressurized flow of output power fluid being of larger magnitude relative to a concurrent change in pressurized flow of the control fluid.

In FIGURE 1, there is shown in schematic form a first analog-type fluid amplifier designated as a whole by numeral 4. Control fluid inlets 5 and 6 are positioned in opposing relationship on opposite sides of a power fluid inlet 7 which forms a power jet normally issuing as indicated by dashed line 8 in a nondeflected manner, impinging equally on receivers 9 and 10. The operation of fluid amplifier 4 may be briefly described as follows. Under conditions of no control fluid flow (or balanced flow) within conduits 11 and 12 which supply fluid to control fluid inlets 5 and 6, respectively, the fluid of the power jet is equally distributed in receivers 9 and 10. Upon a pressurized control fluid flow supplied within conduit 11, or, a differential pressure flow in conduits 11 and 12 such that conduit 11 has a flow of greater magnitude, the power jet is deflected toward receiver 9, the degree of deflection being dependent upon the relative magnitudes of the two control fluid jets. The output of fluid amplifier 4 is thus seen to be push-pull in nature since one receiver obtains a proportionally greater amount of the fluid of the power jet and the second receiver a proportionally smaller amount. The output of fluid amplifier 4 comprises the pressurized fluid flows obtained in receivers 9 and 10 to thereby provide a fluid output differential pressure signal. Conduits 13 and 14 are connected to receivers 9 and 10, respectively, and convey the output differential pressure fluid flow to a pair of fluid-mechanical transducers which in accordance with my invention comprise low pressure driving bellows 15 and 16.

The fluid flowing within conduits 11 and 12 which supply the control signal inputs to amplifier 4 represents the error between a desired position of a movable member being controlled and the actual position thereof in the case wherein the fluid amplifier circuits of FIGURES 2 and 3 are not employed. For the present it will be assumed that the desired and actual position signals have been obtained and combined in a suitable manner to obtain the error signal. The movable member 20 being controlled by my position control system is illustrated as comprising a control rod which is positionably controlled within nuclear reactor pile 21. Rod 20 is operatively coupled to a feedback cam 22 which is stroked by valve stem 23. The tapered feedback cam 22 travels in a longitudinal direction between fixed feedback nozzles 24 and 25 acting as cam followers. The two opposed nozzles 24 and 25 are used to compensate for lack of symmetry due to tolerances, misalignments, and thermal distortion. A fluid flow restrictor which may be described as a dropping orifice 26 is provided in a conduit 27 being supplied at a first end thereof from a relatively constant pressurized source of fluid, $P_{s6}$. Opposed nozzles 24 and 25 are disposed at the second end of conduit 27. A pair of conduits 28, 29 branch from conduit 27 on either side of dropping orifice 26. The pair of conduits 29 and 28 supply a position feedback and bias pressurized fluid signal, respectively, to a portion of the fluid amplifier circuitry which generates the error signal. Fluid flow restrictor 30 decreases the $P_{s6}$ signal to a more convenient bias level.

The actuator for movable member 20 is designated as a whole by numeral 35 and comprises piston 31 which is connected to valve stem 23 within cylinder 32. The position and movement of piston 31 within cylinder 32 thus establishes the position of control rod 20 within reactor pile 21. Conduits 33 and 34 supply pressurized fluid to the opposite sides of piston 31 to determine the position of the movable member 20 being controlled.

Conduits 13 and 14 connected to the output of fluid amplifier 4 can supply the fluid output differential pressure signal thereof directly to the opposite sides of piston 31, however, the friction generated by the piston movement would be proportionally large at the small force levels obtained with such arrangement. The effect of the friction is minimized by employing the arrangement illustrated in FIGURE 1 wherein the low pressure driving bellows 15 and 16 are employed with a flapper-nozzle illustrated as a whole by numeral 40. The greater cross sectional area of the bellows produces a force multiplication and obtains an accurately determined mechanical force. Flapper-nozzle 40 comprises a flapper, pivotable beam 41, which is adapted to be pivoted about its center point 42 by the fluid forces generated within bellows 15 and 16. Bellows 15 and 16 may contact beam 41 in any suitable manner, the particular embodiment illustrated comprising a male member at the end of the bellows adapted to conform to a female member within beam 41. The nozzle portion of flapper-nozzle 40 comprises two nozzles 50 and 51 positioned adjacent opposite ends of beam 41. Nozzles 50 and 51 comprise first ends of conduits 52 and 53, respectively. Conduits 52 and 53 are connected at their second ends by means of fluid flow restrictors 54 and 55, respectively, to sources of pressurized fluid $P_{s7}$ and $P_{s8}$ which, in general, are at the same pressure. Conduits 33 and 34 branch from conduits 52 and 53, respectively, to convey the fluid therein to actuator 35.

The operation of the position control system may be described as follows. Nozzles 50 and 51 are stationarily positioned in a manner such that in the case of zero error between the desired and actual position of movable member 20, the spacings between the ends of nozzles 50 and 51 and the adjacent surface of beam 41 are equal. Under the condition of zero error, the jets of fluid issuing from nozzles 50 and 51 are at substantially equal pressures and the bridge arrangement of fluid flow resistances comprised by restrictors 54, 55 and the inherent resistances of nozzles 50, 51 causes the back pressure of the fluid induced to flow through conduits 33 and 34 to be equal thereby maintaining movable member 20 at a particular position. Now, assume that there is an error between the desired and actual position of movable member 20. Under such latter condition, a differential pressure exists between the fluid flowing in conduits 13 and 14 whereby bellows 15 and 16 are unequally compressed in proportion to the magnitude of the differential pressure. The unequal compression of bellows 15 and 16 pivots beam 41 in a direction to cause a balance of the forces generated by the bellows with the forces generated by the jets issuing from nozzles 50 and 51. This balancing of forces results in unequal spacings between nozzles 50, 51 and beam 41, creating unequal back pressures of the fluid flowing within conduits 33 and 34 to thereby move piston 31 in a direction to decrease the error in the position of movable member 20. The error is decreased by the movement of piston 31 moving feedback cam 22 such that the position feedback control fluid signal $P_{c3}$ generated within conduit 29 is of the proper magnitude, that is, the ratio of position feedback $P_{c3}$ to bias pressures $P_{c4}$ is such as to cause correction of the error in accordance with conventional servo-mechanism theory.

The control system hereinabove described comprising fluid amplifier 4 and the fluid-mechanical system actuated thereby in combination with a suitable transducer for obtaining in pressurized fluid form the desired position of the movable member being controlled is suitable for many position control system applications. However, the operating characteristics of such control system, including both the steady state and transient characteristics, may be such that the system does not have sufficient gain and/or stability to provide a position control system having a desired fast response and high accuracy of control. For such latter type of system, one or both of the following two fluid amplifier circuits constructed in accordance with my invention may be employed. Each of the following two circuits employ specific fluid flow impedence networks to provide frequency responsive attenuation of a fluid flow whereby the fluid amplifier circuit gain varies with the frequency of an input control fluid signal. Thus, the two circuits obtain multiple amplification levels responsive to frequency whereby signals at some frequency levels are only slightly amplified while signals at other frequency levels are more greatly amplified. A first of the two frequency responsive fluid amplifier circuits to be hereinafter described obtains what is described in servomechanism terminology as a transfer function of the lead-lag type. The second circuit provides a lag-lead transfer function. FIGURES 2a and 3a illustrate graphically the amplification or gain versus frequency response which are obtained by the lag-lead and lead-lag fluid amplifier circuits illustrated in FIGURES 2 and 3, respectively.

Referring now to FIGURE 2a, there is illustrated a graph having the logarithm of frequency as the abscissa and the logarithm of $\Delta P_0/\Delta P_c$ as the ordinate wherein the abscissa represents the frequency of the input control signal supplied to the fluid amplifier circuit, such signal in general being the error signal. The ordinate represents the circuit gain, the change in pressurized flow of output power fluid $\Delta P_0$ relative to a concurrent change in pressurized flow of the input control fluid $\Delta P_c$. Thus, for the lag-lead fluid amplifier circuit of FIGURE 2, a substantially constant high gain exists at frequencies below a first lower frequency $f_1$, a decreasing gain from $f_1$ to a second higher frequency $f_2$, and a substantially constant low gain at frequencies above $f_2$.

The lag-lead fluid amplifier circuit illustrated in FIGURE 2 is composed of three serially connected fluid amplifiers 60, 61 and 62. The three fluid amplifiers may be formed in three separate pieces of material but preferably are formed within a single piece to thereby eliminate interconnecting fittings and conduits which may become a source of fluid leakage. The series connection is obtained by connecting the fluid receivers of each of the first two stages of fluid amplifiers to the control fluid inlets of the next succeeding amplifier. Thus, fluid receivers 63, 64 of amplifier 60 are in communication with oppositely disposed control fluid inlets 65 and 66, respectively, of amplifier 61. In like manner, receivers 67 and 68 of amplifier 61 are in communication with a first pair of oppositely disposed control fluid inlets 69 and 70, respectively, of amplifier 62. Receivers 63 and 64 of amplifier 60 are also in communication with a second pair of oppositely disposed control fluid inlets 77 and 76, respectively, of amplifier 62. The power fluid inlets 71, 72 and 73 of fluid amplifiers 60, 61 and 62, respectively, are supplied from sources of relatively constant pressure fluid $P_{s1}$, $P_{s2}$ and $P_{s3}$ wherein the three sources may be at the same or different pressure levels. The pressurized control fluid flow $P_{c1}$, $P_{c2}$ representing the desired position of movable member 20 is obtained from a suitable transducer and is supplied to a first pair of oppositely disposed control fluid inlets 74 and 75 of amplifier 60. The control signal representing the desired position of movable member 20 is the differential pressure between the two control fluid flows supplied from sources $P_{c1}$ and $P_{c2}$. The position feedback and bias control signals indicated in FIGURE 1 are supplied to amplifier 60 and are illustrated as sources of control fluid $P_{c3}$ and $P_{c4}$ in communication with a second pair of oppositely disposed control fluid inlets 78 and 79, respectively. The error signal is the summation of the differential pressures of the desired position and feedback and bias signals. Thus, the error signal, amplified, but unmodified by the hereinafter described impedance network, is also supplied to amplifiers 61 and 62.

A fluid flow impedance network is provided for obtaining frequency responsive attenuation of fluid flow and comprises fluid capacitances and the inherent fluid resistances of the several control fluid nozzles, fluid receivers and interconnecting flow passages. Additional resistance in the form of flow restrictors can be employed, if desired. Fluid capacitors 80 and 81 are provided in the fluid passage connecting receiver 67 to control fluid inlet 69 and the passage connecting receiver 68 to control fluid inlet 70, respectively. Capacitors 80 and 81 may be one of two general types, if a noncompressible fluid such as oil or water is utilized, the fluid capacitors comprise any of a number of conventional hydraulic accumulators such as spring loaded pistons, air bags or the equivalent. If a compressible fluid such as air or steam is employed, the fluid capacitors comprise fixed volumes for containing an amount of fluid as illustrated in the FIGURE 3 embodiment.

Cusps 82 provided between the fluid receivers of each fluid amplifier may be used for venting by providing the cusps with communication to the atmosphere or to a suitable drain for receiving and draining the fluid not deflected to either of the receivers. Vents 83 and 84 are also provided adjacent the receivers to equalize ambient pressures on the opposite sides of the power jet and remove excess fluid from the deflection region. The frequency responsive output fluid signal is obtained at the fluid receivers 85 and 86 of the third stage fluid amplifier 62. The output fluid signal is a differential pressure siginal represented as $P_{01}-P_{02}$, that is, is of push-pull or double ended type. A single ended output signal may also be obtained, if desired. The circular designations in FIGURE 2 and FIGURE 3 represent conduits vertically positioned relative to the plane of the base member 87 in which the various fluid passages and fluid elements are formed. Such vertical conduits provide connection to the various sources of power and control fluids, and for passage of the output and vented fluid.

The operation of the lag-lead type of frequency responsive fluid amplifier circuit illustrated in FIGURE 2 will now be described. Under steady-state conditions of zero error, that is, under conditions of zero differential pressure between the control fluid flows in each fluid amplifier, the power jet is directed between the fluid receivers of each associated fluid amplifier and the power fluid thus flows into cusp 82 and may also be partially but equally distributed within the associated fluid receivers to thereby obtain a zero differential pressure output fluid signal.

Under nonsteady-state or transient conditions, a net differential pressure control fluid flow, the error signal, is supplied to fluid amplifier 60. The differential pressure control signal deflects the power jet issuing from the nozzle of power fluid inlet 71 an amount proportional to the magnitude of the differential pressure such that a selected one of fluid receivers 63 and 64 obtains a greater amount of the pressurized fluid from the deflected power jet than does the other receiver. The fluid within receivers 63 and 64 is the control fluid supplied to control fluid inlets 65 and 66, respectively of amplifier 61. The fluid capacitors 80, 81 offer low resistance to steady-state fluid flow but present a high reactance to fluid flow change. At slow changes in fluid flow, that is, at control fluid signals corresponding to the frequency range below $f_1$ in FIGURE 2a, fluid capacitors 80, 81 have a negligible effect in attenuating the fluid signal, thus the gain $\Delta P_0/\Delta P_c$ of the fluid amplifier circuit has a relatively constant high gain equal to the gain of the three serially connected amplifiers. At more rapid changes in the fluid flow, corresponding to the frequency range between $f_1$ and $f_2$, the A.C. component of fluid flowing between receivers 67, 68 and control fluid inlets 69, 70 is increasingly attenuated by the capacitors with increasing frequency to provide the decreasing gain function between $f_1$ and $f_2$ as seen in FIGURE 2a. At frequencies above $f_2$, the A.C. component of fluid flowing between receivers 67, 68 and control fluid inlets 69, 70 is attenuated sufficiently such that the output signal $\Delta P_0$ (the differential pressure $P_{01}-P_{02}$ is determined primarily by the amplification of the error signal by only the third stage 62 of the fluid amplifier circuitry. Thus, it may be seen that at control fluid signal frequencies below $f_1$ all three stages (60, 61 and 62) of fluid amplification are effective in obtaining the high gain of the circuit whereas at frequencies above $f_2$ only two stages of amplification (60 and 62) provide the gain to thereby obtain a relatively constant low gain at frequencies above $f_2$.

A second frequency responsive fluid amplifier circuit constructed in accordance with my invention may also find application in the position control system hereinabove described and is especially adapted to provide added stability in the control system operation. This second fluid amplifier circuit is of the frequency responsive type which provides what is conventionally known as a lead-lag function. Most configurations of lead-lag circuits require insertion of fluid resistances in the circuit. These restrictions are often troublesome in that they are sensitive to contamination. The circuit described here requires no such restrictions, the restrictive effect being produced by the input impedance of the fluid amplifiers. The lead-lag circuit is comprised of two serially connected fluid amplifiers 90 and 91. Amplifiers 90 and 91 have power fluid inlets 92 and 93, respectively, supplied from sources of relatively constant pressurized fluid $P_{s4}$ and $P_{s5}$. Amplifier 90 is provided with a first pair of oppositely disposed control fluid inlets 94 and 95 supplied from sources of control fluid $P_{c5}$ and $P_{c6}$, respectively, which in general are adapted to provide a differential pressure signal. In the control system of FIGURE 1, the output fluid signal $P_{01}-P_{02}$ provided by the circuit of FIGURE 2 becomes the control signal input $P_{c5}-P_{c6}$ to the circuit of FIGURE 3. The first stage amplifier 90 is provided with a pair of fluid receivers 96 and 97 which are in communication with the control fluid inlets 98 and 99, respectively, of the second stage amplifier 91. Second stage amplifier 91 is provided with a pair of fluid receivers 100 and 101 which are connected in negative feedback communication with a second pair of oppositely disposed control fluid inlets 102 and 103, respectively, of the first stage amplifier 90. Fluid capacitances 104 and 105 are provided in the feedback fluid passages, and in the particular illustration of FIGURE 3 are indicated as predetermined volumes for containing an amount of fluid and thus illustrate the compressible fluid embodiment as distinguished from the noncompressible fluid embodiment of FIGURE 2. Cusps 82 and vents 83, 84 are provided in each of fluid amplifiers 90 and 91 and serve the same purpose as the corresponding elements in FIGURE 2. The output of the lead-lag circuit of FIGURE 3 is obtained at the receivers 96 and 97 of the first stage fluid amplifier 90 and the differential pressure output fluid flow thereat is indicated $P_{03}$, $P_{04}$ at the outlet conduits.

The operation of the lead-lag circuit will now be explained. At slow changes in the flow of the control fluid supplied to control fluid inlets 94, 95, a quantity of fluid enters the feedback fluid passages and fills capacitors 104, 105 to thereafter flow to the control fluid inlets 103, 102 and thereby provide a negative feedback signal. The slow changes in fluid flow correspond to the frequency range below $f_3$ in FIGURE 3a where the fluid capacitors have a negligible effect in attenuating the A.C. component of feedback fluid flow and thus the negative feedback is sufficient to maintain the fluid amplifier circuit at a low amplification or gain level. As the frequency of the control input signal rises to a frequency range between $f_3$ and $f_4$, the fluid feedback signal is increasingly attenuated with increasing frequency as seen in FIGURE 3a. At frequencies above $f_4$, the feedback signal is attenuated sufficiently to provide a negligible feedback signal and thereby obtain a relatively constant high gain.

The basic position control system employing only fluid amplifier 4, bellows 15, 16 and the fluid-mechanical system for positioning movable member 20 is completed by adding a second pair of oppositely disposed control fluid inlets to fluid amplifier 4 and supplying the four control fluid inlets with the desired position control signal $P_{c1}$, $P_{c2}$ and the feedback signals $P_{c3}$, $P_{c4}$. In many applications the basic position control system may be provided with additional gain by employing the lag-lead circuit of FIGURE 2. The lead-lag circuit of FIGURE 3 may also be employed in conjunction with the lag-lead circuit, or alone, to provide additional stability for the basic position control system.

The lag-lead circuit illustrated in detail in FIGURE 2 may, of course, be constructed of four serially connected fluid amplifiers by adding an additional stage of amplification between amplifiers 60 and 61 or between 61 and 62. The advantages of the four stage circuit are (1) the error signal within the fluid passages interconnecting the receivers of the first stage with the control fluid inlets of the last stage is of the correct polarity such that no cross-over of fluid passages is required as in the three stage embodiment illustrated in FIGURE 2, (2) a higher circuit gain is obtained, and (3) a greater spread between the two frequencies $f_1$, $f_2$, commonly referred to as "Bode diagram break points" in the control system art is obtained. A still higher circuit gain and greater spread between frequencies $f_1$, $f_2$ may be obtained by employing any odd number of serially connected fluid amplifiers greater than three in the circuit configuration of FIGURE 2 wherein the polarity of the error signal is such that it is supplied to the last stage fluid amplifier by the inconvenience of crossing over other fluid passages. In like manner, the circuit gain and spread between frequencies $f_1$, $f_2$ may be increased by employing any even number of serially connected fluid amplifiers greater than two wherein the polarity of the error signal is correct as described above with reference to the four stage circuit.

The lead-lag circuit of FIGURE 3 is illustrated as comprising two serially connected fluid amplifiers. This circuit may likewise be comprised of a greater number of serially connected fluid amplifiers for obtaining a high circuit gain and greater spread between the break point frequencies $f_3$ and $f_4$ in the following manner. Any even number of amplifiers may be serially connected in the same circuit configuration as illustrated in FIGURE 3, that is, the differential output signal being obtained across the fluid receivers of the next to last stage and the output of the last stage fed back to the first stage. Alternatively, any odd number of fluid amplifiers greater than one may be serially connected to obtain a higher gain and greater spread between break point frequencies $f_3$, $f_4$ by reversing the feedback paths from the last stage to the first stage amplifier.

From the foregoing description, it can be appreciated that my invention makes available a new position control system which employs the novel combination of fluid amplifier circuitry and low pressure driving bellows for generating a mechanical force that obtains the positioning of a controllable movable member. The fluid amplifier circuitry may comprise a single fluid amplifier, but in general, further includes a fluid amplifier circuit having a gain that is frequency responsive to obtain a desired control system response. The frequency responsive effect is achieved by employing fluid capacitances and the inherent resistance of the circuit such that no additional orifices or restrictions need be employed. The additional fluid amplifier circuit may be of the lag-lead type or the lead-lag type or a combination thereof. The position control system of my invention is characterized by a high accuracy of control and a relatively fast speed of response since the fluid amplifier circuitry determines the desired gain and stability for the control system. The use of fluid amplifiers having no moving mechanical parts, and therefore an essentially unlimited life span, is particularly well suited for applications such as, but not limited to, nuclear reactor position rod control systems wherein the environmental conditions of nuclear radiation and high temperature may cause electronic types of control to be inoperable, or at best, not capable of the extreme reliability required for nuclear reactor control.

What I claim as new and desire to secure by Letters Patent of the United States is:

1. A fluid amplifier circuit for providing a lead-lag type of frequency response to an input fluid signal comprising:
   a first fluid amplifier comprising:
      a first power fluid inlet for generating a first power jet of fluid,
      a first pair of fluid receiving means downstream from said first power fluid inlet for receiving fluid of the first power jet,
      a first pair of oppositely disposed control fluid inlets for generating first control jets of fluid which by momentum exchange controllably deflect the first power jet relative to said first pair of receiving means, said first pair of control fluid inlets adapted to be supplied with an input fluid signal,
      a second pair of oppositely disposed control fluid inlets for generating second control jets of fluid which by momentum exchange controllably deflect the first power jet relative to said first pair of receiving means,
   a second fluid amplifier comprising:
      a second power fluid inlet for generating a second power jet of fluid,
      a second pair of fluid receiving means downstream from said second power fluid inlet for receiving fluid of the second power jet,
      a third pair of oppositely disposed control fluid inlets for generating third control jets of fluid which by momentum exchange controllably deflect the second power jet relative to said second pair of receiving means, said third pair of control fluid inlets in communication with said first pair of receiving means,
   passage means for providing feedback flow of fluid from said second pair of receiving means to said second pair of oppositely disposed control fluid inlets in negative feedback relationship,
   means included within said feedback passage means for providing frequency responsive attentuation of the feedback fluid flow, and
   fluid outlet means in communication with said first pair of receiving means for providing an output fluid signal having a gain versus frequency response varying with the frequency of the input signal in a manner whereby the gain of the fluid amplifier circuit is substantially constant at frequencies below a first lower frequency, the gain increases with increasing frequency between the first frequency and a second higher frequency, and the increased gain is substantially constant at frequencies above the second frequency.

2. The fluid amplifier circuit set forth in claim 1 wherein said means for providing frequency responsive attenuation comprise fluid reactance means.

3. The fluid amplifier circuit set forth in claim 1 wherein said means for providing frequency responsive attenuation comprise fluid capacitance means.

4. The fluid amplifier circuit set forth in claim 1 wherein said means for providing frequency responsive attenuation comprise fixed volumes.

5. The fluid amplifier circuit set forth in claim 1 wherein said means for providing frequency responsive attenuation comprise hydraulic accumulators.

6. A fluid amplifier circuit for providing a lead-lag type of frequency response to an input fluid signal comprising:
   a plurality of serially connected fluid amplifiers,
   a first of said serially connected fluid amplifiers comprising:
      a first power fluid inlet for generating a first power jet of fluid,
      a first pair of fluid receiving means downstream from said first power fluid inlet for receiving fluid of the first power jet, said first pair of receiving means in communication with a pair of control fluid inlets of the immediately succeeding serially connected fluid amplifier,
      a first pair of oppositely disposed control fluid inlets for generating first control jets of fluid which by momentum exchange controllably deflect the first power jet relative to said first pair of receiving means, said first pair of control fluid inlets adapted to be supplied with an input differential pressure fluid singal,
      a second pair of oppositely disposed control fluid inlets for generating second control jets of fluid which by momentum exchange controllably deflect the first power jet relative to said first pair of receiving means,
   a last of said serially connected fluid amplifiers comprising:
      a second power fluid inlet for generating a second power jet of fluid,
      a second pair of fluid receiving means downstream from said second power fluid inlet for receiving fluid of the second power jet,
      a third pair of oppositely disposed control fluid inlets for generating third control jets of fluid which by momentum exchange controllably deflect the second power jet relative to said second pair of receiving means, said third pair of control fluid inlets in communication with a pair of receiving means of the immediately preceding serially connected fluid amplifier,
   passage means for providing feedback flow of fluid from said second pair of receiving means to said second pair of oppositely disposed control fluid inlets in negative feedback relationship,
   means included within said feedback passage means for providing frequency responsive attenuation of the feedback fluid flow, and
   fluid outlet means in communication with said pair of receiving means of said immediately preceding serially connected fluid amplifier for providing an output fluid signal having a gain versus frequency response varying with the frequency of the input fluid signal in a manner whereby the gain of the fluid amplifier circuit is substantially constant at frequencies below a first lower frequency, the gain increases with increasing frequency between the first frequency and a second higher frequency, and the increased gain is substantially constant at frequencies above the second frequency, the difference between the first and second frequencies becoming greater as the number of serially connected fluid amplifiers comprising the circuit is increased.

7. In a fluid amplifier position control system the combination of:
a fluid amplifier circuit for generating a pair of pressurized fluid signals wherein the magnitude of differential pressure between the pair of signals represents the error between a desired position of a movable member being controlled and the actual position thereof,
said circuit also comprising means for providing a lead-lag type of frequency response to the pair of signals to thereby obtain a desired control system stability,
said circuit further comprising means for providing a lag-lead type of frequency response to the pair of signals to thereby obtain a desired increased control system gain, and
a pair of bellows means in communication with outputs of said fluid amplifier circuit for obtaining a sufficiently high force to actuate a force-balance means which positions the movable member being controlled.

8. In a fluid amplifier position control system the combination of
a fluid amplifier circuit comprising at least two serially connected analog-type fluid amplifiers,
a first of said fluid amplifiers having first control inputs supplied with pressurized fluid flows having a magnitude of differential pressure representing the error between a desired position of a movable member being controlled and the actual position thereof,
a second of said fluid amplifiers having control inputs thereof in communication with outputs of said first fluid amplifier,
passage means for providing feedback flow of fluid from outputs of said second fluid amplifier to second control inputs of said first fluid amplifier in negative feedback relationship,
fluid capacitance means included within said feedback passage means for providing frequency responsive attenuation of the feedback fluid flow, and
bellows means in communication with the outputs of said first fluid amplifier for obtaining a sufficiently high force to actuate a force-balance means which positions the movable member being controlled and thereby obtain a highly reliable position control system that may be operable under extreme environmental conditions, said fluid amplifier circuit providing a lead-lag type of frequency response to the fluid flow representing position error to thereby obtain a desired control system stability.

9. In a fluid amplifier position control system the combination of:
a fluid amplifier circuit comprising at least three serially connected analog-type fluid amplifiers,
a first of said fluid amplifiers having control inputs supplied with pressurized fluid flows having a magnitude of differential pressure representing the error between a desired position of a movable member being controlled and the actual position thereof,
a second of said fluid amplifiers having control inputs thereof in communication with outputs of said first amplifier,
a third of said fluid amplifiers having first control inputs thereof in communication wtih outputs of said first fluid amplifier and second control inputs thereof in communication with outputs of said second amplifier,
fluid capacitance means included within fluid passages which obtain the communication between the outputs of said second fluid amplifier and the second control inputs of said third fluid amplifier for providing frequency responsive attenuation of the fluid flows supplied to said first fluid amplifier, and
bellows means in communication with the outputs of said third fluid amplifier for obtaining a sufficiently high force to actuate a force-balance means which positions the movable member being controlled and thereby obtains a highly reliable position control system that may be operable under extreme environmental conditions, said fluid amplifier circuit providing a lag-lead type of frequency response to the fluid flow representing position error to thereby obtain a desired control system gain.

References Cited

UNITED STATES PATENTS

| | | | |
|---|---|---|---|
| 3,292,648 | 12/1966 | Colston | 137—81.5 X |
| 3,302,398 | 2/1967 | Taplin et al. | 137—81.5 X |
| 2,967,537 | 1/1961 | Morris | 137—85 |
| 3,040,715 | 6/1962 | McCombs | 137—625.62 |
| 3,131,601 | 5/1964 | Curran | 137—81.5 |
| 3,223,103 | 12/1965 | Trinkler | 137—81.5 |
| 3,223,101 | 12/1965 | Bowles | 137—81.5 |

M. CARY NELSON, Primary Examiner

WILLIAM R. CLINE, Assistant Examiner

U.S. Cl. X.R.

235—201